United States Patent
Robertson

[11] 3,797,702
[45] Mar. 19, 1974

[54] SCRAP RECOVERY AND FEED SYSTEM

[76] Inventor: Joseph D. Robertson, 980 Swathmore Dr., N.W., Atlanta, Ga. 30327

[22] Filed: Mar. 29, 1971

[21] Appl. No.: 128,973

[52] U.S. Cl. .................... 222/1, 222/136, 222/145, 259/8
[51] Int. Cl. ........................... B01f 7/20, B01f 7/24
[58] Field of Search ........... 222/136, 145, 133, 241, 222/460, 462, 1; 259/97, 191, 192, DIG. 31, 7, 8; 425/217

[56] References Cited
UNITED STATES PATENTS

| | | | |
|---|---|---|---|
| 1,268,813 | 6/1918 | Benjamins | 259/97 |
| 3,177,527 | 4/1965 | Nelson | 222/241 X |
| 3,386,707 | 6/1968 | Brown | 259/180 X |
| 3,148,412 | 9/1964 | Spreeuwers | 259/191 |
| 1,651,390 | 12/1927 | Hersman | 222/136 X |
| 1,925,541 | 9/1933 | Noble | 222/145 X |
| 3,231,243 | 1/1966 | Armstrong | 259/97 X |
| 2,517,456 | 8/1950 | Wherrett | 259/7 |
| 2,995,775 | 8/1961 | Schnitzius et al. | 425/217 |
| 3,182,969 | 5/1965 | Rupp | 259/97 X |

*Primary Examiner*—Robert B. Reeves
*Assistant Examiner*—Frederick R. Handren
*Attorney, Agent, or Firm*—Jones, Thomas & Askew

[57] ABSTRACT

A scrap recovery and feed system wherein scrap plastic is recovered from a plastic manufacturing process, such as in the manufacture of sheet, film, formed or molded objects, and the scrap plastic is chopped up and fed back to the processing machine along with the base material, such as a virgin plastic material and various additives. The scrap is fed with an auger from an upper hopper toward the outlet opening of a lower hopper containing the base material. The materials are mixed just prior to entry in the extruder or other processing machine.

8 Claims, 4 Drawing Figures

PATENTED MAR 19 1974

3,797,702

INVENTOR
JOSEPH D. ROBERTSON

BY
*Jones & Thomas*

ATTORNEYS

SCRAP RECOVERY AND FEED SYSTEM

BACKGROUND OF THE INVENTION

In the manufacture of plastic sheet or film materials, such as polyethylene, polyvinyl chloride, and polystyrene, both in dense form and foam form, the material is sometimes extruded in the form of a bubble or circular tube and moved away from the extruder a distance necessary to cool and cure the product. The bubble can be treated in various ways to form various products. For instance, the bubble can be slit along its length, spread flat and rolled into a reel, or the bubble can be flattened, rolled into a reel, or bags can be formed, or the bubble can be flattened and its edges trimmed to form two or more separate sheets, and the separate sheets can be accumulated in separate rolls.

The material produced from trimming the plastic material is scrap and must be disposed of or possibly recycled with the virgin plastic or base material, and additives such as a color additive. Scrap is also generated by producing unacceptable rolls and unacceptable other finished products such as bags, etc. It is highly desirable to recycle the scrap material, since it is difficult to dispose of and costly to reclaim in a separate operation. The recycling of the scrap material, therefore, helps to reduce the cost of manufacturing the product.

While various scrap recovery systems have been developed in the past for recycling the scrap plastic material with the base material through the process machine such as an extruder, the previous systems have been costly and erratic in operation. They do not function to feed the mixture of scrap material and base material in a uniform mixture to the process machine. The base material fed to the process machine usually is more dense than the scrap material so that when the base and scrap material are placed in a common supply container, the base material tends to migrate toward the lower portion of the container while the scrap material tends to float on the base material. This causes the base material to be fed from the lower outlet opening of the supply container to the extruder while the scrap material accumulates in the container. The scrap material is later fed to the extruder in large quantities which creates undesirable results such as an inconsistency in the extruded product, "fish eyes" or jells being formed in the product, and occasionally in the process machine being starved by an insufficient supply of material.

In order to eliminate the accumulation of a large amount of scrap material in the common supply container at the extruder, the size of the common supply container in the past has been reduced so that it is impossible to accumulate a large supply of the scrap material; however, the reduction in volume of the common supply container is undesirable since, for instance, only a small amount of base material and scrap material can be maintained at the extruder, and the extruder is occasionally starved of either base material or scrap material when a low level of material in the common supply container is not discovered very quickly and compensated for.

SUMMARY OF THE INVENTION

Briefly described, the present invention comprises a scrap recovery and feed system for a plastic manufacturing system for the production of sheet, film, formed and molded objects, etc., wherein the scrap material from the manufacturing system is recycled and mixed with the base material, such as virgin plastic material with necessary additives or reprocessed material etc., in a generally predetermined consistent mixture and the mixture is fed to the extruder without hazard of depleting the base material or feeding an excessive quantity of scrap material to the extruder.

Thus, it is an object of this invention to provide a scrap recovery and feed system for a plastic manufacturing system for sheet, film, etc., which is effective to recycle the scrap from a plastic manufacturing system through the processing machine of the system at a predetermined uniform rate without hazard of depleting the supply of base plastic material to the process machine while producing a desirable product.

Another object of this invention is to provide a scrap recovery and feed apparatus which is inexpensive to manufacture, easy to install, occupies a minimum amount of floor space, which functions automatically, and which is utilized as part of a system which forms a desirable and uniform plastic product.

Other objects, features and advantages of the present invention will become apparent upon reading the following specification when taken into conjunction with the accompanying drawing.

DESCRIPTION OF A PREFERRED EMBODIMENT

Figures 1, 2, 3, 4:
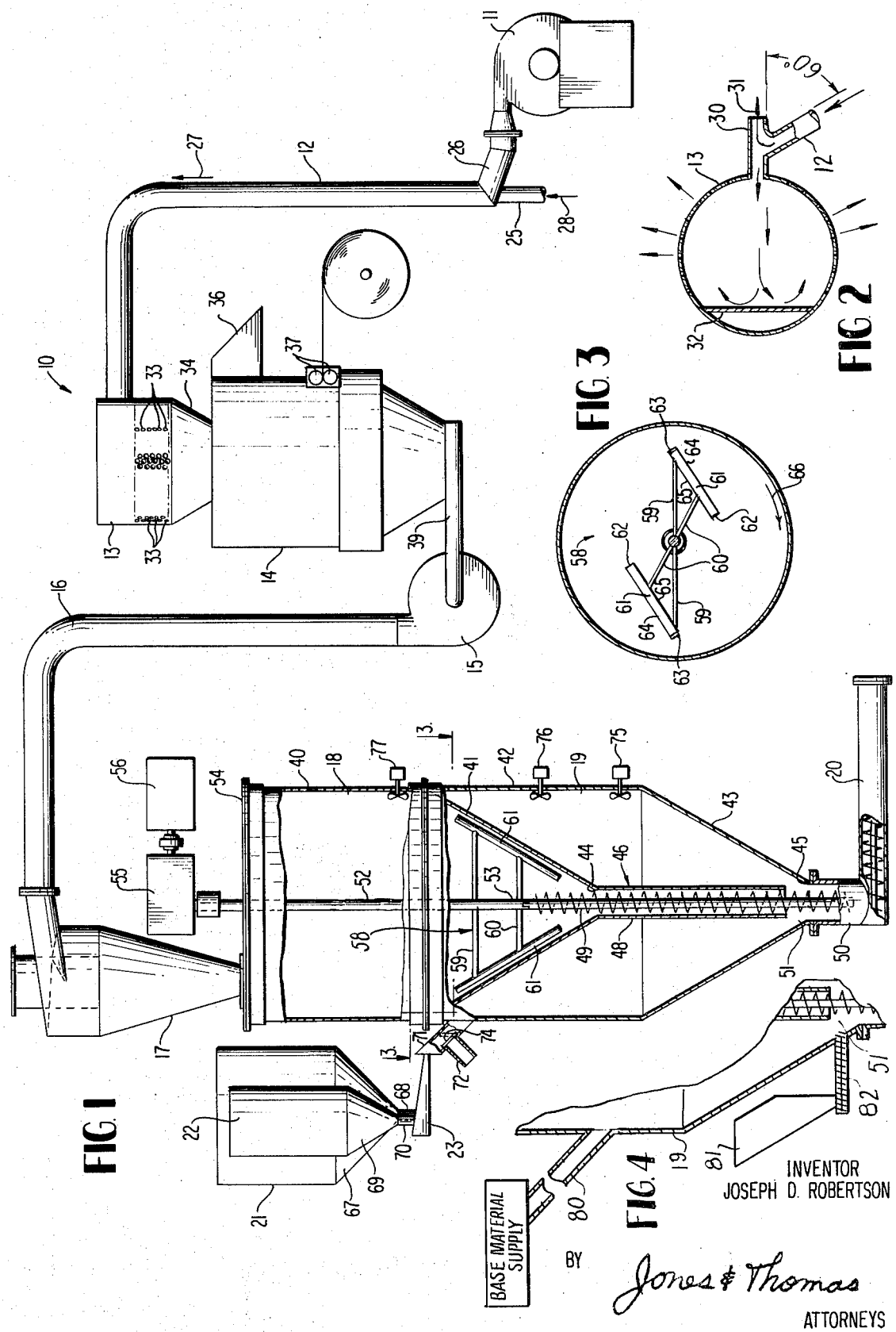
FIG. 1 is a schematic illustration of the scrap recovery and feed system.
FIG. 2 is a top schematic illustration of the air eliminator.
FIG. 3 is a top cross-sectional view of the ground scrap hopper.
FIG. 4 is a partial view of a modified base material feed hopper.

Referring now in more detail to the drawing, in which like numerals indicate like parts throughout the several views, FIG. 1 shows a scrap recovery and feed system 10 which includes inducer blower 11, scrap conduit 12, having an internal venturi (not shown), air eliminator 13, grinder 14, ground scrap blower 15, ground scrap conduit 16, centrifugal separator 17, scrap plastic feed hopper 18, base material feed hopper 19, and a process machine, such as extruder 20. Supply hopper 21 and color material supply hopper 22 communicate with base material feed hopper 19 by means of feeder 23. Scrap conduit 12 includes a branch conduit 25 into which the edge or middle trimmings from a plastic product manufacturing process (not shown) are fed. Branch conduit 25 can be of virtually any length and usually extends toward the source of edge trimmings. The exhaust conduit 26 of inducer blower 11 communicates with scrap conduit 12 and branch conduit 25 at an angle and through the venturi so that the flow through scrap conduit 12 is in the direction indicated by arrow 27, and induces an air stream into branch conduit 25 as indicated by arrow 28. The scrap material then flows with the air stream through scrap conduit 12 toward air eliminator 13.

As is illustrated in FIG. 2, exhaust branch conduit 30 and scrap conduit 12 intersect each other at an angle of approximately 60 degrees before scrap conduit 12 enters air eliminator 13. Exhaust branch conduit 30 is open to the atmosphere, and a portion of the air flowing through scrap conduit 12 flows out of exhaust branch conduit 30, as indicated by arrow 31. The other portion of the air stream through scrap conduit 12 enters air eliminator 13 with the scrap material.

Impervious baffle 32 is positioned inside air eliminator 13 and is oriented in an approximately upright attitude and is approximately perpendicular to the direction of flow of the air stream as it enters air eliminator 13. Scrap conduit 12 enters air eliminator 13 at its upper portion and the middle portion of air eliminator 13 includes a plurality of closely spaced air exhaust openings 33 (FIG. 1) while the lower portion 34 is inwardly tapered in a conical configuration and may or may not have a plurality of openings. A substantial portion of the air of the air stream entering air eliminator 13 is exhausted through air exhaust openings 33. As is illustrated in FIG. 2, the air stream enters generally on a radius across the center of air eliminator 13, generally impinges upon baffle 32 and then generally flows in a downward turbulent direction through air exhaust openings 33. In the meantime, the scrap material carried by the air stream usually extends directly from the edges of the plastic product through the branch conduit 25 into scrap conduit 12 and then into air eliminator 13. The long strips of scrap material tend to fall to the bobbom of air eliminator 13 toward grinder 14.

Grinder 14 is of conventional construction and its internal components generally form no material part of the present invention. Grinder 14 operates to chop or grind the scrap material received from air eliminator 13 into small particles of scrap which can be carried in an air stream. Grinder 14 also includes inlet opening 36 through which large masses of scrap can be introduced into grinder 14 and feed rollers 37 are located in a sidewall of grinder 14 and operate to progressively feed sheet scrap material or other continuous scrap material into grinder 14. The sheet material or other continuous scrap material and the larger bulk material fed to grinder 14 through opening 36 also is ground into small particles.

The particles from grinder 14 pass to inlet conduit 39 of ground scrap blower 15 and the air stream from grinder 14 and the atmosphere through inlet conduit 39 and ground scrap conduit 16 carries the ground scrap to centrifugal separator 17. Centrifugal separator 17 functions to separate the ground scrap from the flowing air and allows the ground scrap to fall into ground scrap feed hopper 18 while the air is exhausted to the area above the centrifugal separator.

Ground scrap feed hopper 18 usually includes an upper cylindrical portion 40 and includes a lower conical wall portion 41. Base material feed hopper 19 is shaped in generally the same manner as ground scrap feed hopper 18 and usually includes upper cylindrical portion 42 and includes lower conical wall portion 43. Ground scrap feed hopper 18 is supported adjacent base material feed hopper 19 and the lower conical portion 41 of ground scrap feed hopper 18 extends into the base material feed hopper. The lower end of lower conical portion 41 of ground scrap feed hopper 18 defines an outlet opening 44 while the lower end of lower conical portion 43 of base material feed hopper 19 defines an outlet opening 45. Outlet openings 44 and 45, upper cylindrical portions 40 and 42, and lower conical portions 41 and 43 are all generally concentric, and auger conveyor assembly 46 extends through the assembly generally along its vertical centerline.

Auger conveyor assembly 46 includes tubular auger housing 48, preferably of cylindrical cross-section, which is connected to outlet opening 44 of lower conical portion 41 of ground scrap hopper 18 and extends in a downward direction through base material feed hopper 19 and terminates in the proximity of the outlet opening 45 of base material feed hopper 19. Auger 49 extends through auger housing 48 and beyond the ends of auger housing 48. Auger 49 extends from up into lower conical portion 41 of ground scrap hopper 18, below outlet opening 45 of base material feed hopper 19, and usually into feed conduit 50 at extruder 20. The diameter of feed conduit 50 is larger than auger 49 so that an annular base material feed area or throat 51 is defined at outlet opening 45 of base material feed hopper 19 and through feed conduit 50.

Auger 49 is supported by drive shaft 52 through coupling 53 in lower conical portion 41 of ground scrap hopper 15. Drive shaft 52 extends through the upper closure 54 of ground scrap feed hopper 18 and is connected to transmission 55 and drive motor 56. Drive motor 56 is either variable speed on constant speed.

A bridge breaker or paddle assembly 58 is supported by drive shaft 52 in lower conical portion 41 of ground scrap feed hopper 18. Paddle assembly 58 includes upper and lower laterally extending support rods 59 and 60 which form support means or paddle blades 61. As is illustrated in FIG. 3, upper support rods 59 are longer than lower supports rods 60, and lower support rods 60 lead upper support rods 59 in the direction of rotation of paddle assembly 58 as indicated by arrow 66. Paddles 61 are connected to the outer ends of upper and lower support rods 59 and 60 and paddles 61 are oriented so that their lower ends 62 are positioned closer to auger 49 or the vertical centerline of the assembly than the upper ends 63, and the lower ends 62 are displaced ahead of the upper ends 63 with respect to the direction of rotation 66. The paddles are angled or canted with the outer edges 64 being located closer to the inner surface of the lower conical portion 41 of the hopper and ahead of the inner edges 65. The arrangement is such that when paddle assembly 58 is rotated and paddles 61 engage the ground scrap present in ground scrap feed hopper 18, the ground scrap so engaged will be inclined to move inwardly and upwardly with respect to lower conical portion of ground scrap feed hopper 18.

Since auger 49 extends upwardly beyond the upper end of auger housing 48 and into lower conical portion 41 of ground feed hopper 18, the ground scrap present in ground scrap feed hopper 18 will be urged through auger housing 48 by the rotation of auger 49. Auger 49 and its housing 48 then function as a conveyor means to convey the ground scrap along auger housing 48 through base material feed hopper 19 toward outlet opening 45 of hopper 19 and toward feed conduit 50.

Base material supply hopper 21 includes a lower conical portion 67 and an outlet duct 68 through which the uncolored or virgin plastic material flows. Color material supply hopper 22 is formed in a similar manner and includes lower conical portion 69 and outlet duct 70. Feeder 23 communicates with the outlet ducts 68 and 70. Feeder 23 is a vibrating feeder and causes the virgin and color material to migrate toward inlet chute 71 of base material feed hopper 19. Inlet chute 71 is inclined downwardly so that the material received therein falls under the force of gravity into base material feed hopper 19. Feeder 23 includes a partition (not shown) centrally along its length so that the virgin and color materials are maintained in separate troughs as they approach chute 71. Chute 71 also includes a partition (not shown), so that the materials are maintained apart from each other until they fall into the confines of pellet hopper 19. Inlet chute 71 also includes a branch conduit 72 which extends downwardly therefrom and a diverter door 74 normally covers branch conduit 72 but is movable from the solid line position to the broken line position so as to function to divert the flow of material from inlet chute 71 through branch conduit 72. Branch conduit 72 also incudes a partition (not shown) so that the virgin and color material flow separately therethrough.

Under normal conditions, the supply of base material in base material feed hopper 19 is maintained at a level above the lower conical portion 43 so that a large supply of base material is at hand and ready for feeding to extruder 20. The weight of the base material andd the ability of the base material to flow cause the base material to readily migrate toward the bottom of base material feed hopper 19 toward the annular feed area 51. The dimensions of annular feed area 51 are such that if auger 49 of auger conveyor assembly 46 is not in operation and there is room in extruder 20 for more base material the base material will flow freely under the influence of gravity into extruder 20.

Bin level controls 75, 76 and 77 are of conventional construction and are placed at various elevations along the height of feed hoppers 18 and 19 and can be used to detect the presence of absence of material at their elevations in the hoppers. Bin level control 75 is located adjacent the intersection of upper cylindrical portion 42 and lower conical portion 43 of base material feed hopper 19 and functions to operate an alarm to indicate a low level of base material in feed hopper 19. Bin level control 76 is spaced upwardly from bin level control 75 and is located at an elevation where the desired level of base material should be maintained within feed hopper 19. When bin level control 76 detects an absence of pellets at its level it functions to acuate feeder 23 and cause more base material to be dispensed to feed hopper 19 from supply hoppers 21 and 22. Bin level control 77 is located near the intersection of upper cylindrical portion 40 and lower conical portion 41 of ground scrap feed hopper 18 and functions to actuate feed rollers 37 and cause sheet material to be fed from the roll of scrap material into grinder 14.

As an alternative to the use of supply hoppers 21 and 22 and feeder 23 for feeding the base material and color material to hopper 19, a supply of base material can communicate directly and continuously with hopper 19 through open conduit 80 at the upper portion of supply hopper 19 as is illustrated in FIG. 4. The base material can be allowed to flow freely under the influence of gravity to keep the hopper full at all times, or bin level control 76 can be used to control the inflow. The color material can be metered into base material supply hopper 19 from a storage bin 81 by means of auger conveyor 82. With this arrangement, the color material will be mixed with the base material at the lower end of base material supply hopper 19, at the feed area 51. With this arrangement the bin level controls 75 and 76 can be eliminated, and more positive and immediate color control is maintained in the finished product. If it is desired to determine the rate at which the color material is being metered into hopper 19 a trap door opening (not shown) can be constructed in the housing of auger 82 in order to open the auger conveyor housing and allow the material being transported thereby to fall from the auger. The workman can accumulate the color material that falls from the trap door opening for a set time duration to determine the rate of feed of the color material through the auger, and the speed of operation of the auger can be adjusted, as necessary, to achieve the proper metering of the color material.

OPERATION

When the scrap recovery and feed system 10 is placed in operation the scrap trimmings from the plastic material taken from extruder 20 or the like are led to branch conduit 25 of scrap conduit 12. The air stream from inducer blower 11 induces the edge trimmings to extend through scrap conduit 12 as the edge trimmings are formed, and the edge trimmings eventually reach air eliminator 13. The air from the air stream flowing through scrap conduit 12 will be partially depleted through exhaust branch conduit 30 (FIG. 2) and the remaining air in the air stream will be depleted through air exhaust openings 33 of air eliminator 13 and through grinder 14 to material blower 15. In the meantime, the continuous trimmings will tend to extend downwardly through air eliminator 13 into grainder 14 where the trimmings will be reduced to ground scrap.

The ground scrap from grinder 14 passes through conduit 39 with the air stream induced through material blower 15 and is carried through ground scrap conduit 16 toward centrifugal separator 17. The air from the air stream is separated from the ground scrap in separator 17 and the ground scrap falls into ground scrap feed hopper 18. In the meantime, feeder 22 causes base material and color material to be dispensed from hoppers 21 and 22 and a supply of base material flows through inlet chute 71 into feed hopper 19. Feed hopper 19 will continue to be filled with base and color material until the level of base material covers bin level control 76 whereupon blender-feeder 22 will cease its operation. If the embodiment of FIG. 4 is utilized, the base material flows freely into base material hopper 19 and auger conveyor 82 meters the color material directly into the throat 51 at the inlet of extruder 20.

Drive motor 56, which is variable speed or constant speed, functions to rotate drive shaft 52 through transmission 55. Drive shaft 52 rotates paddle assembly 58 and keeps the ground scrap from bridging in the lower conical portion 41 of hopper 18. Drive shaft 52 also rotates auger 19 and causes the ground scrap to be urged through auger housing 48. The ground scrap is conveyed through base material feed hopper 19 and the body of base material in the hopper by auger conveyor assembly 46 toward the annular base material feed area or throat 51 at the outlet opening 45 of base material feed hopper 19. The base material from feed hopper 19 mixes with the ground scrap in feed area 51 at outlet opening 45 of lower conical portion 43 and through feed conduit 50.

Roll scrap can be processed through grinder 14 in addition to or instead of the edges trimmings. Bin level control 77 functions to start and stop feed rollers 37 so as to maintain an adequate supply of ground scrap in hopper 18 without overfilling the hopper. The base material in feed hopper 19 will tend to flow freely into extruder 20 and the dimensions of annular pellet feed area or throat 51 at the lower portion of base material feed hopper 19 are such that a sufficient supply of pellets will always be fed to extruder 20 and extruder 20 will never be starved of raw material, even if auger 19 is not rotating.

Variable speed drive 56 can be adjusted to cause the proper supply of ground scrap to be fed through feed conduit 50 at all times.

In order to control the color of manufactured product, it is necessary to control the ratio of base material and coloring material fed from hoppers 21 and 22. The openings of conduit 68 and 70 at the lower ends of hoppers 21 and 22 can be adjusted so as to dispense the pellets at the proper rate. The ratio of base material and color material being fed to feed hopper 19 can be checked by moving diverter 74 in inlet chute 71 to its dashed line position whereupon the pellets will be diverted through branch conduit 72 and can be collected individually and inspected. Since feeder 22, inlet chute 71 and branch conduit 72 all include a partition, the base material and color material can be collected separately and weighed if desired. This will provide a reliable indicator as to the ratio of color and base material being fed to base material feed hopper 19, and the inconvenience and waste that might be created by waiting for the manufactured product to emerge from extruder 20 to detect the color of the product is avoided.

If the embodiment of FIG. 4 is used to supply base material and color material to hopper 19, auger conveyor 82 meters the color material directly into throat 51 while base material hopper 19 is maintained full of base material by free gravity flow of base material from a supply.

While this invention has been described in detail with particular reference to preferred embodiments thereof, it will be understood that variations and modifications can be effected within the spirit and scope of the invention as described hereinbefore and as defined in the appended claims.

I claim:

1. A feed system for feeding a mixture of ground scrap and base material to an extruding means or the like comprising a ground scrap hopper including a converging lower wall portion and defining an inlet for receiving ground scrap and a separate outlet opening, a base material hopper positioned below said ground scrap hopper and including a converging lower wall portion and defining an inlet for receiving base material and a separate outlet opening, the outlet opening of said ground scrap hopper and the outlet opening of said base material hopper being positioned in approximate vertical alignment with respect to each other, an auger conveyor assembly extending from the outlet opening of said ground scrap hopper into said base material hopper and terminating generally at said base material hopper outlet opening, and conveyor drive means connected to said auger conveyor assembly.

2. The feed system of claim 1 and further including a centrifugal separator positioned above said ground scrap hopper and arranged to receive a stream of air and ground scrap, said centrifugal separator being arranged to exhaust a major portion of the air from the stream away from the ground scrap hopper and divert a major portion of the ground scrap from the stream into the inlet of said ground scrap hopper.

3. The feed system of claim 1, and further including a metering means for metering a color material or the like into the lower portion of said base material hopper.

4. A feed system for feeding a mixture of ground scrap and base material to an extruding means or the like comprising a ground scrap hopper including a converging lower wall portion and defining an inlet at its upper portion for receiving ground scrap and an outlet opening at its lower portion, a base material hopper positioned below said ground scrap hopper and including a converging lower wall portion and defining an inlet at its upper portion for receiving base material and an outlet opening at its lower portion, an auger conveyor assembly extending from the outlet opening of said ground scrap hopper into said base material hopper and terminating generally at said base material hopper outlet opening, conveyor drive means connected to said auger conveyor assembly, and a bridge breaker assembly connected to said auger conveyor assembly and rotatable in said ground scrap hopper about a vertical axis in the vicinity of the converging lower wall portion of said ground scrap hopper, said bridge breaker assembly comprising support means extending from said auger conveyor assembly and at least one paddle member connected to said support means and oriented on an incline with its lower end positioned closer to said auger conveyor assembly than its upper end.

5. A feed system for feeding a mixture of plastic ground scrap and plastic base material to an extruding means or the like comprising a ground scrap hopper including a generally conical lower wall portion and defining an inlet at its upper portion for receiving ground scrap and an outlet opening at its lower portion, a base material hopper positioned below said ground scrap hopper and including a generally conical lower wall portion and defining an inlet at its upper portion for receiving plastic base material and an outlet opening at its lower portion, and an auger conveyor assembly comprising a tubular conveyor housing extending from the outlet opening of said ground scrap hopper into said base material hopper and terminating generally at said base material hopper outlet opening and generally in alignment with said base material hopper outlet opening, an auger extending from within said ground scrap hopper through said tubular conveyor housing, beyond the lower end of said conveyor housing and into said base material hopper outlet opening, conveyor drive means connected to said auger, a base material supply hopper and an additive material supply hopper, feed means extending between said base material supply hopper and said additive material supply hopper and the inlet of said base material feed hopper and arranged to feed base material and additive material at a prescribed rate from said base material supply hopper and additive material supply hopper to said base material feed hopper, said feed means including material diverting means for diverting the flow of base material and additive material away from said base material feed hopper in separate streams.

6. A feed system for feeding a mixture of scrap and base material to a processing machine comprising a scrap hopper including a converging lower wall portion defining an outlet opening at its lower portion, a base material hopper positioned below said scrap hopper and including a converging lower wall portion defining an outlet opening at its lower portion, and an auger conveyor extending in a downward direction from the outlet opening of said scrap hopper into said base material hopper in a direction extending generally through said base material hoppers and terminating generally at said base material hopper outlet opening for conveying scrap from the scrap hopper in a downward direction through the base material hopper to the base material hopper outlet opening and urging both the scrap and base material to the processing machine.

7. A method of feeding a mixture of ground scrap and base material to an extruder or the like comprising flowing base material under the influence of gravity down an inclined hopper surface and through an outlet opening of a base material feed hopper toward the extruder, urging ground scrap from a ground scrap feed hopper in a downward direction through the base material in the base material feed hopper through the outlet opening of the base material feed hopper, and combining the ground scrap and base material and flowing the combined scrap and base material to the extruder.

8. The method of claim 7 and comprising flowing the base material through the outlet opening of the base material feed hopper at a rate approximately equal to the inlet capacity of the extruder less the rate of flow of ground scrap through the outlet opening of the base material feed hopper, and varying the rate of flow of ground scrap as desired.

\* \* \* \* \*